(12) United States Patent
Han et al.

(10) Patent No.: US 8,905,561 B2
(45) Date of Patent: *Dec. 9, 2014

(54) REFLECTIVE STRUCTURE, DISPLAY APPARATUS INCLUDING THE REFLECTIVE STRUCTURE, AND METHODS OF MANUFACTURING THE REFLECTIVE STRUCTURE AND THE DISPLAY APPARATUS

(75) Inventors: Moon Gyu Han, Yongin-si (KR); Hong-seok Lee, Yongin-si (KR); Jung H. Shin, Daejeon (KR); Kyung Jae Chung, Daejeon (KR)

(73) Assignees: Samsung Electronics Co., Ltd., Gyeonggi-Do (KR); Korea Advanced Institute of Science and Technology, Daejeon (KR)

( * ) Notice: Subject to any disclaimer, the term of this patent is extended or adjusted under 35 U.S.C. 154(b) by 608 days.

This patent is subject to a terminal disclaimer.

(21) Appl. No.: 12/805,642

(22) Filed: Aug. 11, 2010

(65) Prior Publication Data

US 2011/0235182 A1 Sep. 29, 2011

(30) Foreign Application Priority Data

Mar. 26, 2010 (KR) .................. 10-2010-0027548

(51) Int. Cl.
*G02B 5/08* (2006.01)
*G02B 7/182* (2006.01)
(Continued)

(52) U.S. Cl.
CPC .......... *B29D 11/00326* (2013.01); *B82Y 20/00* (2013.01); *G02B 5/10* (2013.01);
(Continued)

(58) Field of Classification Search
USPC ......... 359/487, 498, 583, 585, 615, 619–629, 359/630, 633, 883; 430/5, 321; 428/143, 428/147, 212, 323; 427/162, 203, 299
See application file for complete search history.

(56) References Cited

U.S. PATENT DOCUMENTS 6,351,334 B1 * 2/2002 Hsieh et al. .................. 359/571
6,482,722 B2 * 11/2002 Kunii et al. .................. 438/487

(Continued)

FOREIGN PATENT DOCUMENTS

JP 7-263727 A 10/1995
JP 2001-083516 A 3/2001

(Continued)

OTHER PUBLICATIONS

US Office Action dated May 29, 2013 for related U.S. Appl. No. 12/654,713.

(Continued)

*Primary Examiner* — Scott J Sugarman
*Assistant Examiner* — Mustak Choudhury
(74) *Attorney, Agent, or Firm* — Harness, Dickey & Pierce, P.L.C.

(57) ABSTRACT

Provided are a reflective structure, a display apparatus including the reflective structure, and methods of manufacturing the reflective structure and the display apparatus. The reflective structure may include a reflective layer having a multiple uneven structure. The reflective layer may have a curved surface as a result of a plurality of first uneven portions, and wherein the curved surface may has a plurality of second uneven portions having a scale less than that of the first uneven portions. The plurality of first uneven portions may have a micro-scale size, and the plurality of second uneven portions may have a nano-scale size. The reflective layer may be arranged on a lower structure including a plurality of nanoparticles. A flexible material layer may be formed on the reflective layer.

24 Claims, 8 Drawing Sheets
(3 of 8 Drawing Sheet(s) Filed in Color)

(51) Int. Cl.
    *G02B 27/14*     (2006.01)
    *B05D 1/36*     (2006.01)
    *B05D 3/00*     (2006.01)
    *B82Y 20/00*     (2011.01)
    *B29D 11/00*     (2006.01)
    *G02B 5/10*     (2006.01)

(52) U.S. Cl.
    CPC ........ G02B 5/0816 (2013.01); B29D 11/00346 (2013.01)
    USPC ........... 359/883; 359/631; 359/632; 427/203; 427/299

(56) References Cited

U.S. PATENT DOCUMENTS

| | | |
|---|---|---|
| 7,385,659 B2 | 6/2008 | Kotchick |
| 7,540,616 B2 * | 6/2009 | Conner ............... 353/20 |
| 2006/0023127 A1 * | 2/2006 | Peeters et al. ............ 349/1 |
| 2006/0127665 A1 * | 6/2006 | Masutani et al. ......... 428/323 |
| 2007/0206263 A1 | 9/2007 | Neuman et al. |
| 2008/0160185 A1 * | 7/2008 | Endle et al. ............ 427/162 |
| 2008/0199653 A1 | 8/2008 | Kuo et al. |
| 2008/0291523 A1 | 11/2008 | Tonar et al. |
| 2009/0147196 A1 * | 6/2009 | Horie et al. ............ 349/122 |
| 2010/0150513 A1 | 6/2010 | Zhang et al. |
| 2010/0177393 A1 * | 7/2010 | Lee et al. ............... 359/584 |

FOREIGN PATENT DOCUMENTS

| | | |
|---|---|---|
| KR | 10-2004-0066207 A | 7/2004 |
| KR | 10-0930924 A | 7/2009 |
| KR | 10-2009-0106948 | 10/2009 |

OTHER PUBLICATIONS

US Office Action dated Jan. 8, 2014 for related U.S. Appl. No. 12/654,713.

* cited by examiner

< COMPARATIVE EXAMPLE >

US 8,905,561 B2

REFLECTIVE STRUCTURE, DISPLAY APPARATUS INCLUDING THE REFLECTIVE STRUCTURE, AND METHODS OF MANUFACTURING THE REFLECTIVE STRUCTURE AND THE DISPLAY APPARATUS

CROSS-REFERENCE TO RELATED APPLICATIONS

This application claims priority under U.S.C. §119 to Korean Patent Application No. 10-2010-0027548, filed on Mar. 26, 2010, in the Korean Intellectual Property Office (KIPO), the entire contents of which are incorporated herein in by reference.

BACKGROUND

1. Field

The present disclosure relates to a reflective structure, a display apparatus including the reflective structure, and methods of manufacturing the reflective structure and the display apparatus.

2. Description of the Related Art

In general, pigments are used to realize colors. Color realization using pigments involves the absorbance of light. However, color realization technology using the absorbance of light is not efficient and has problems in terms of controlling chromaticity.

In order to solve such problems of the conventional technology, color realization technology using reflection and interference of light, structural color technology, has been proposed. In structural color technology, since efficiency is determined according to a reflectance of a reflector, it is possible to realize colors with high efficiency. Also, since chromaticity is determined according to the wavelength of light that is reflected, the control of the chromaticity may be easy.

However, in structural color technology for realizing colors by using the reflection and interference of light, a color may be differently realized depending on an angle of light incident on the reflector, an incident angle, and a viewing angle. Moreover, multi-coloration may occur since the color can be bright or dim at a specific angle because of constructive and destructive interference of diffracted light.

SUMMARY

Provided are one or more example embodiments that include an omni-directional reflective structure which does not cause a color change according to a viewing angle and a method of manufacturing the omni-directional reflective structure.

Provided are one or more example embodiments that include a display apparatus including the reflective structure and a method of manufacturing the display apparatus.

Additional aspects will be set forth in part in the description which follows and, in part, will be apparent from the description, or may be learned by practice of example embodiments.

According to example embodiments, a reflective structure includes a reflective layer, wherein the reflective layer has a curved surface as a result of a plurality of first uneven portions, and wherein the curved surface has a plurality of second uneven portions having a scale less than that of the first uneven portions on the curved surface.

The plurality of first uneven portions may have a micro-scale size. For example, the plurality of first uneven portions may be in the range of tens to hundreds of micrometers in width.

The plurality of second uneven portions may have a nano-scale size. For example, the plurality of second uneven portions may be in the range of tens to hundreds of nanometers in width.

The reflective layer may be formed on a plurality of nanoparticles.

The reflective structure may further include a transparent and flexible material layer formed on the reflective layer.

The transparent and flexible material layer may include a polymer layer.

The reflective structure may be arranged on a flexible substrate or a rigid substrate.

At least a portion of the plurality of first uneven portions may constitute a wrinkled shape.

The reflective layer may have a structure in which first layers and second layers are alternately stacked. In this case, the first layer and the second layer may be different dielectric layers, or one of the first layer and the second layer may be a dielectric layer and the other may be a metal layer.

According to example embodiments, a display apparatus includes the reflective structure. The display apparatus may be a polymer dispersed liquid crystal (PDLC) display apparatus, or a liquid crystal display (LCD), or the like.

According to example embodiments, a method of manufacturing a reflective structure includes forming a reflective layer having an uneven surface as a result of a plurality of uneven portions having a nano-scale size on the surface of the reflective layer; and forming a plurality of uneven portions having a micro-scale size on the surface of the reflective layer while maintaining the plurality of uneven portions having a nano-scale size.

Forming the plurality of uneven portions having the micro-scale size may include rapid cooling the reflective layer.

Rapidly cooling the reflective layer may include spraying a volatile liquid on the reflective layer.

Forming the reflective layer may include forming a plurality of nanoparticles on a first substrate; and forming the reflective layer on the plurality of nanoparticles, wherein the reflective layer has an uneven surface as a result of the plurality of nanoparticles.

At least some of the plurality of nanoparticles may be formed in such a manner that a distance between adjacent nanoparticles is in the range of nanometers to tens of nanometers.

The method may further include forming a transparent and flexible material layer on the reflective layer.

The method may further include separating a stacked structure from the first substrate, wherein the stacked structure includes the plurality of nanoparticles, the reflective layer, and the transparent and flexible material layer.

The method may further include adhering the stacked structure to a second substrate.

The second substrate may be a flexible substrate or a rigid substrate.

According to example embodiments, a method of manufacturing a reflective structure includes forming a plurality of nanoparticles on a first substrate; forming a reflective layer on the first substrate so as to cover the plurality of nanoparticles; forming a flexible material layer on the reflective layer; and separating a stacked structure from the first substrate, wherein the stacked structure comprises the plurality of nanoparticles, the reflective layer, and the flexible material layer.

The plurality of nanoparticles may be of non-uniform size.

The reflective layer may be formed to have an uneven surface as a result of the plurality of nanoparticles.

The flexible material layer may be transparent.

The flexible material layer may include a polymer layer.

The method may further include adhering the stacked structure that is separated from the first substrate to a second substrate.

The second substrate may be a flexible substrate or a rigid substrate.

BRIEF DESCRIPTION OF THE DRAWINGS

The patent or application file contains at least one drawing executed in color. Copies of this patent or patent application publication with color drawing will be provided by the Office upon request and payment of the necessary fee.

These and/or other aspects will become apparent and more readily appreciated from the following description of example embodiments, taken in conjunction with the accompanying drawings of which.

DETAILED DESCRIPTION

Figure 1:
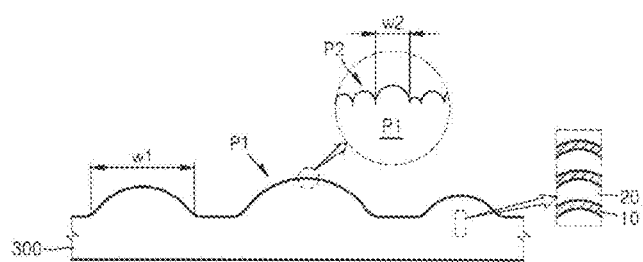
FIG. 1 is a cross-sectional view of a reflective layer according to example embodiments.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

In the drawings, the thicknesses of layers and regions are exaggerated for clarity. Like reference numerals in the drawings denote like elements.

Hereinafter, a reflective structure, a display apparatus including the reflective structure, and a method of manufacturing the reflective structure and the display apparatus according to example embodiments will be described with reference to the accompanying drawings. In this regard, the present embodiments may have different forms and should not be construed as being limited to the descriptions set forth herein. Accordingly, the embodiments are merely described below, by referring to the figures, to explain aspects of the present description.

FIG. 1 is a cross-sectional view of a reflective layer 300 according to example embodiments.

Referring to FIG. 1, the reflective layer 300 may have an uneven surface as a result of a plurality of first uneven portions P1. The plurality of first uneven portions P1 may have a micro-scale size. For example, a width (hereinafter, a first width) w1 of each of the plurality of first uneven portions P1 may be in the range of tens to hundreds of micrometers. A height of each of the plurality of first uneven portions P1 may be equal to or greater than tens of micrometers. Viewing the plurality of first uneven portions P1 from above, at least a portion of the plurality of first uneven portions P1 may constitute a wrinkled shape. The plurality of first uneven portions P1 may have non-uniform sizes. Thus, it is possible to describe that a surface of the reflective layer 300 may have micro-scale curves.

Referring to a magnified partial view in circle of FIG. 1, a surface of each of the plurality of first uneven portions P1 may has a plurality of second uneven portions P2 smaller than the first uneven portions P1 on the surface of the plurality of first uneven portions P1. The plurality of second uneven portions P2 may have a nano-scale size. For example, a width (hereinafter, a second width) w2 of each of the plurality of second uneven portions P2 may be in the range of tens to hundreds of nanometers. The plurality of second uneven portions P2 may have a hemisphere shape or a shape similar to a hemisphere, and sizes of the plurality of second uneven portions P2 may be non-uniform. The plurality of second uneven portions P2 may be formed on entire upper surface of the reflective layer 300.

In this manner, a structure in which small uneven portions, the second uneven portions P2, are formed on a surface of a large uneven portion (that is, the first uneven portion P1) is referred to as "multiple uneven structure". An effect caused by the multiple uneven structure will be described later.

Referring to another magnified partial view in quadrangle of FIG. 1, the reflective layer 300 may have a multilayer structure in which first and second layers 10 and 20 are alternately stacked. The first layer 10 and the second layer 20 may have different refractive indexes. Since the refractive indexes of the first and second layers 10 and 20 are different from each other, the reflection of light may occur at an interface between the first layer 10 and the second layer 20. By changing materials and thicknesses of the first and second layers 10 and 20, a wavelength of the reflected light may vary. Thus, according to the materials and the thicknesses of the first and second layers 10 and 20, colors exhibited or reflected by the reflective layer 300 may vary. For example, it is possible to obtain various reflection spectrums of red (R), green (G), blue (B), or the like, according to the materials and thicknesses of the first and second layers 10 and 20.

In the present embodiment, one of the first and second layers 10 and 20 may be a non-dielectric layer, and the other one of the first and second layers 10 and 20 may be a dielectric layer. The non-dielectric layer may be a metal layer. For example, the first layer 10 may be a metal layer, and the second layer 20 may be a dielectric layer. Thus, the reflective layer 300 may have a structure in which metal layers and dielectric layers are alternately stacked. In a case where the first layer 10 is a metal layer, the first layer 10 may be formed of a transition metal such as chromium (Cr), nickel (Ni), cobalt (Co), or the like. However, the first layer 10 may be formed of other metals in addition to the transition metal. When the first layer 10 is a metal layer, the first layer 10 may be formed to be as thin as possible so that the absorbance of light via the first layer 10 may be minimized. For example, the first layer 10 may be formed to have a thickness less than about 50 nm, for example, less than about 20 nm. In a case where the second layer 20 is a dielectric layer, the second layer 20 may be formed of silicon dioxide ($SiO_2$), silicon nitride ($Si_3N_4$), titanium oxide ($TiO_2$), tin oxide ($SnO_2$), antimony tin oxide (ATO), calcium fluoride ($CaF_2$), lithium fluoride (LiF), magnesium fluoride ($MgF_2$), or the like, but a material of the second layer 20 may be others. The second layer 20 may have an optical thickness corresponding to $\lambda/2$ (where $\lambda$ indicates a center wavelength of the light to be reflected). When the second layer 20 has the optical thickness corresponding to $\lambda/2$, constructive interference of diffracted light may occur. According to another embodiment, the first and second layers 10 and 20 may be formed as different dielectric layers. That is, the reflective layer 300 may have a structure in which first dielectric layers and second dielectric layers are alternately stacked. In this structure, the reflection of light having a specific wavelength may also occur at an interface between the first layer 10 and the second layer 20.

In the reflective layer 300 according to the present embodiment, the plurality of second uneven portions P2 having a nano-scale size may have random heights and may be densely arrayed on the entire upper surface of the reflective layer 300, so that the reflection, diffraction, and scattering of light may occur from each of the plurality of second uneven portions P2. Thus, the reflective layer 300 may have an omni-directional reflection characteristic by which a color change according to a viewing angle does not occur. Also, in the reflective layer 300, the plurality of second uneven portions P2 are formed on a curved surface as a result of the plurality of first uneven portions P1 having a micro-scale size. In other words, the surface of the reflective layer 300, on which the plurality of second uneven portions P2 having a nano-scale size are formed, has curved shape as a result of the plurality of first uneven portions P1 having a micro-scale size. Thus, the reflective layer 300 may exhibit or reflect a bright color at any viewing angle even under a non-specular illumination condition. If the plurality of second uneven portions P2 are not formed on the curved surface of the plurality of first uneven portions P1 but arrayed on a flat side of a reflective layer 310 (refer to FIG. 2), the reflective layer 310 may have a specular reflection characteristic, as will be described in detail with reference to FIG. 2.

Figure 2:
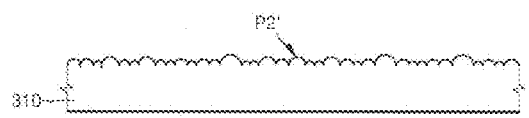
FIG. 2 is a cross-sectional view of a reflective layer according to a comparative example.

FIG. 2 is a cross-sectional view of the reflective layer 310 according to a comparative example.

Referring to FIG. 2, a plurality of uneven portions P2' having a nano-scale size are densely arrayed on an upper surface of the reflective layer 310. Similar to the plurality of second uneven portions P2 of FIG. 1, the plurality of uneven portions P2' have non-uniform sizes and random heights, but, unlike the plurality of second uneven portions P2 of FIG. 1, the plurality of uneven portions P2' are arrayed on planar surface. Here, the plurality of uneven portions P2' have a nano-scale size, and are densely arrayed. Also, a difference of heights of the plurality of uneven portions P2' is small, about 100 nm, so that the upper surface of the reflective layer 310 may have the specular reflection characteristic. Thus, in a case where an incident angle is equal to an viewing angle, the reflective layer 310 reflects light like a mirror and an image of an external object is reflected on the reflective layer 310, such that it may be difficult to obtain an exact color of light intended to be reflected. Also, in a case where the incident angle is different from the viewing angle, the upper surface of the reflective layer 310 may be dim. Due to the plurality of uneven portions P2' having random heights, the reflective layer 310 may have a characteristic in which a color change does not occur according to a viewing angle, but may make a particular color look brighter or dimmer according to the viewing angle.

However, like the above embodiment of FIG. 1, when the plurality of second uneven portions P2 having a nano-scale size are formed on a curved surface having a micro-scale size, that is, on the curved surface as a result of the plurality of first uneven portions P1, the reflective layer 300 does not reflect light like a mirror and may exhibit a bright color at any viewing angle. This is because the surface of the reflective layer 300 has a macroscopically, randomly rough shape. Also, since the surface of the reflective layer 300 includes nano-scaled uneven portions (the plurality of second uneven portions P2), the reflection, diffraction, and scattering of light may occur from each of the plurality of second uneven portions P2, and the reflective layer 300 may have the omni-directional reflection characteristic by which a color change according to a viewing angle does not occur. Thus, the reflective layer 300 does not cause the color change according to the viewing angle, and has high reflectance at an omni-direction (at all viewing angles), so that the reflective layer 300 may exhibit or reflect a color that looks bright at any angle.

Figure 3:
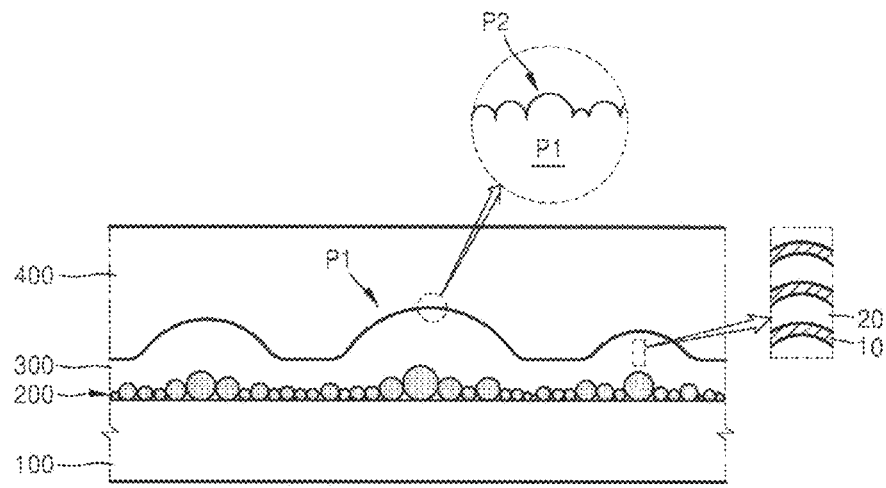
FIG. 3 is a cross-sectional view of a reflective structure including a reflective layer according to example embodiments.

FIG. 3 is a cross-sectional view of a reflective structure including a reflective layer 300 according to an example embodiment.

Referring to FIG. 3, a plurality of nanoparticles 200 may be arranged on a substrate 100. The substrate 100 may be a flexible substrate or a rigid substrate. The flexible substrate and the rigid substrate may include materials that are used in a general display apparatus manufacturing process and a general semiconductor manufacturing process. The substrate 100 may be transparent or opaque. The plurality of nanoparticles 200 may have non-uniform sizes. The plurality of nanoparticles 200 may form a mono-layer but not limited thereto. Some adjacent nanoparticles 200 of the plurality of nanoparticles 200 may not contact each other. A material of the plurality of nanoparticles 200 may be a silicon oxide, polycrystalline silicon, and the like but not limited thereto and other materials may be used. The plurality of nanoparticles 200 may be in the range of tens to hundreds of nanometers in diameter.

The reflective layer 300 may be arranged on the substrate 100 so as to cover the plurality of nanoparticles 200. The reflective layer 300 may have the same structure as the reflective layer 300 of FIG. 1. That is, a upper surface of the reflective layer 300 may have the multiple uneven structure in which the plurality of first uneven portions P1 having a micro-scale size and the plurality of second uneven portions P2 having a nano-scale size are formed. Also, the reflective layer 300 may have the multilayer structure on which the first and second layers 10 and 20 are alternately stacked. Here, sizes of the plurality of second uneven portions P2 may be similar to the sizes of the plurality of nanoparticles 200. For convenience of description, in FIG. 3, although the second uneven portions P2 are only illustrated in a magnified partial view in circle, and the plurality of nanoparticles 200 are illustrated as if they have relatively larger sizes, the actual sizes of the plurality of second uneven portions P2 may be similar to the sizes of the plurality of nanoparticles 200, in the range of tens to hundreds of nanometers in diameter.

A transparent flexible material layer 400 may further be arranged on the reflective layer 300. The transparent flexible material layer 400 may be a polymer layer but not limited thereto. When the substrate 100 is a flexible substrate, the reflective structure of FIG. 3 may be entirely flexible and may be applied to a flexible display apparatus.

In addition, the reflective structure according to the one or more embodiments may have a plurality of reflective layers for exhibiting or reflecting different colors on a substrate. For example, first through third reflective layers may be formed in different regions of the substrate, and by varying thicknesses and/or materials of layers for forming the first through third reflective layers, the first through third reflective layers may be formed to reflect different colors such as red, green, and blue colors.

Hereinafter, a method of manufacturing a reflective structure will be described.

FIGS. 4A through 4H are diagrams for describing a method of manufacturing a reflective structure, according to an example embodiment.

Figure 4A:
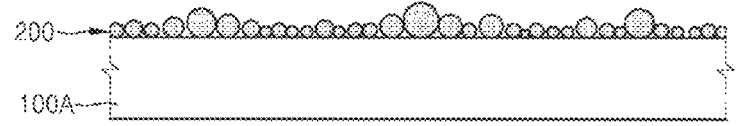
FIGS. 4A through 4H are cross-sectional views for describing a method of manufacturing a reflective structure, according to example embodiments.

Referring to FIG. 4A, a plurality of nanoparticles 200 having non-uniform sizes may be coated on a first substrate 100A. The first substrate 100A may be a rigid substrate. The first substrate 100A may be any substrate that is used in a display apparatus manufacturing process or a semiconductor manufacturing process. For example, a material of the first substrate 100A may be a semiconductor including silicon or may be an insulating material including silicon oxide. The material of the first substrate 100A may also be a conductive material including a metal or a metal oxide. The plurality of nanoparticles 200 may be formed using a spin coating method but not limited thereto. A material of the plurality of nanoparticles 200 may be a silicon oxide, polycrystalline silicon, and the like but other materials may be used. The plurality of nanoparticles 200 may be in the range of tens to hundreds of nanometers in diameter. The plurality of nanoparticles 200 may form a mono-layer but one or more embodiments are not limited thereto.

At least some of the plurality of nanoparticles 200 may be formed in such a manner that a distance between each of the adjacent nanoparticles 200 may be in the range of nanometers to tens of nanometers. It is possible to intentionally adjust a density of the plurality of nanoparticles 200 so as to prevent that the plurality of nanoparticles 200 are very densely formed. However, in spite of the intentional adjustment, some of the plurality of nanoparticles 200 may contact each other.

Although a thermal treatment process is not performed, the plurality of nanoparticles 200 may be lightly adhered to the first substrate 100A. Thus, it is possible to proceed with a subsequent process without performing the thermal treatment process. However, if necessary, the adherence of the plurality of nanoparticles 200 to the first substrate 100A may be increased by performing the thermal treatment process. According to a temperature and a time of thermal treatment, the adhering force may be adjusted. In a case where the plurality of nanoparticles 200 are lightly adhered to the first substrate 100A, the plurality of nanoparticles 200 may be easily separated from the first substrate 100A. However, according to cases, it may be not necessary to separate the plurality of nanoparticles 200 from the first substrate 100A, thus, in the operation described with reference to FIG. 4A, the plurality of nanoparticles 200 may be firmly adhered to the first substrate 100A by performing the thermal treatment process. In a case where the thermal treatment process is performed, the first substrate 100A may be the rigid substrate capable of standing a temperature of the thermal treatment process.

Figure 4B:
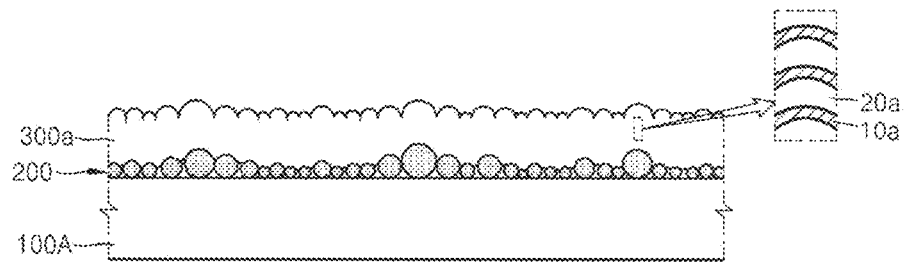

Referring to FIG. 4B, a reflective layer 300a may be formed on the plurality of nanoparticles 200. The reflective layer 300a may be formed to conform with the shapes of the plurality of nanoparticles 200, thereby having random heights. The reflective layer 300a may have a structure in which first and second layers 10a and 20a are alternately stacked. Materials, thicknesses, and the like of the first and second layers 10a and 20a may be similar or equal to the first and second layers 10 and 20 of FIG. 1, respectively. In order to form the first and second layers 10a and 20a, a process temperature of about several hundred° C., e.g., about 300° C., may be required. In this case, the first substrate 100A may be a rigid substrate capable of standing the process temperature.

Figure 4C:
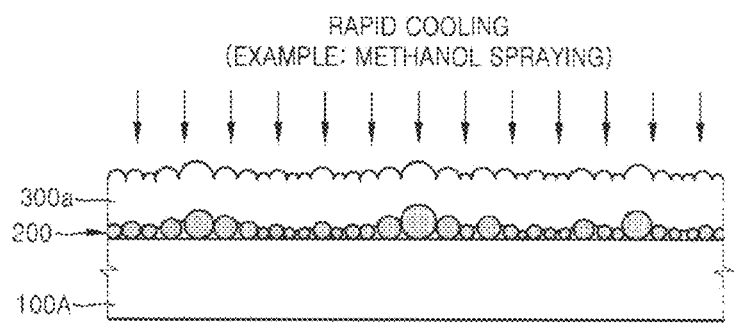

Afterward, as illustrated in FIG. 4C, the reflective layer 300a may be rapidly cooled. The rapid cooling may be performed by spraying a volatile liquid on the reflective layer 300a. The volatile liquid may include methanol, ethanol, acetone, or the like but not limited thereto and thus may vary. During the rapid cooling, the surface morphology of the reflective layer 300a may be deformed, and a result thereof is illustrated in FIG. 4D.

Figure 4D:
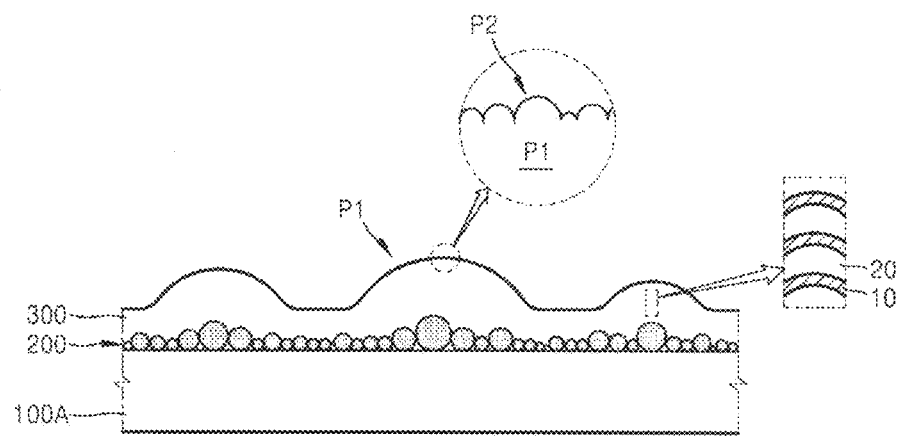

Referring to FIG. 4D, reference numeral 300 indicates a rapidly-cooled reflective layer (hereinafter, reflective layer 300). The reflective layer 300 may have a similar structure to the reflective layer 300 of FIGS. 1 and 3. That is, the reflective layer 300 may have a multiple uneven structure in which a plurality of first uneven portions P1 having a micro-scale size and a plurality of second uneven portions P2 having a nano-scale size are formed. Here, the plurality of second uneven portions P2 may have unevenness similar or equal to the unevenness on the reflective layer 300a of FIG. 4B. In other words, by rapid cooling, it is possible to form large unevenness (the plurality of first uneven portions P1) on the reflective layer 300 while the unevenness (in FIG. 4B) formed on a surface of the reflective layer 300a is almost maintained. For convenience of description, in FIG. 4D, the second uneven portions P2 are only illustrated in a magnified partial view in circle. However, the plurality of second uneven portions P2 may be formed on an entire upper surface of the reflective layer 300, and may have similar sizes to the plurality of nanoparticles 200. The rapid cooling may affect the plurality of nanoparticles 200. For example, during rapid cooling, some adjacent nanoparticles of the plurality of nanoparticles 200 may be adhered to each other. This adherence of the adjacent nanoparticles may occur in several locations. When the adjacent nanoparticles are adhered to each other, a surface of the reflective layer 300a of FIG. 4C is shrunken (i.e., curled up) at the same time, so that the reflective layer 300 of FIG. 4D may be obtained. This method/mechanism is only one example, and thus other methods in addition to the rapid cooling may also deform the reflective layer 300a of FIG. 4B into the reflective layer 300 of FIG. 4D.

Figure 4E:
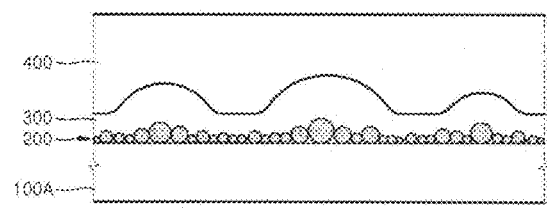

Referring to FIG. 4E, a flexible material layer 400 may be formed on the reflective layer 300. The flexible material layer 400 may be transparent. For example, the flexible material layer 400 may be a transparent polymer layer. In this case, if necessary, a hardening (curing) process may be performed on the flexible material layer 400. The flexible material layer 400 may intrinsically have adherence to the reflective layer 300, but the flexible material layer 400 may not have it. In a case where the flexible material layer 400 does not have intrinsic adherence, an adherence layer (not shown) may further be arranged between the reflective layer 300 and the flexible material layer 400.

Figure 4F:
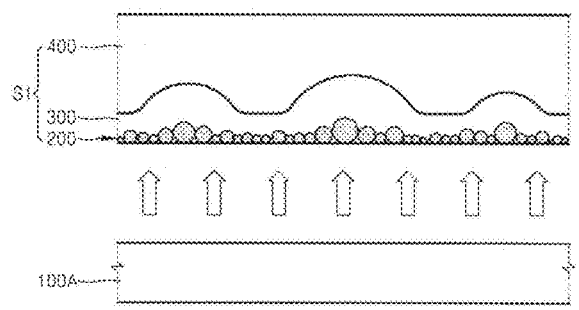

Referring to FIG. 4F, a stacked structure S1 including the plurality of nanoparticles 200, the reflective layer 300, and the flexible material layer 400 may be separated from the first substrate 100A. In the process described with reference to FIG. 4A, the plurality of nanoparticles 200 may be lightly adhered to the first substrate 100A, and the adherence of the plurality of nanoparticles 200 to the first substrate 100A may be decreased during processes described with reference to FIGS. 4C and 4D, so that the stacked structure S1 may be easily separated from the first substrate 100A during the process described with reference to FIG. 4F.

Figure 4G:
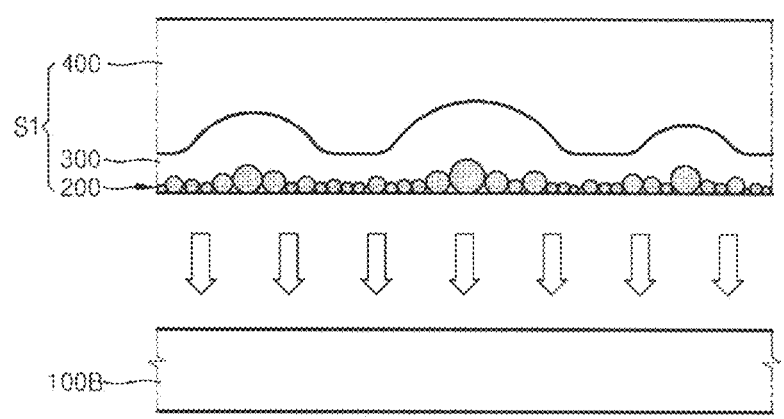
Figure 4H:
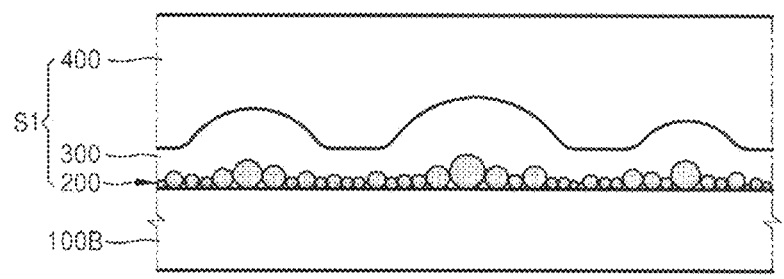

Referring to FIGS. 4G and 4H, the stacked structure S1 including the plurality of nanoparticles 200, the reflective layer 300, and the flexible material layer 400 may be adhered to a second substrate 100B. By forming an adherence layer (or an adhesive) (not shown) on at least one of a bottom surface of the stacked structure S1 and a top surface of the second substrate 100B, and then by using the adherence layer (or the adhesive), the second substrate 100B and the stacked structure S1 may be adhered to each other. However, the stacked structure S1 may be fixed on the second substrate 100B by using other means in addition to the adherence layer (or the adhesive). The second substrate 100B may be a flexible substrate. If the flexible substrate is used as the second substrate 100B, it is possible to manufacture a flexible reflective structure. However, a rigid substrate may be used as the second substrate 100B. The flexible substrate and the rigid substrate may include materials that are used in a general display apparatus manufacturing process and a general semiconductor manufacturing process.

Although not illustrated here, a plurality of stacked structures S1 may be adhered to one large substrate. In this case, the plurality of stacked structures S1 may include three types of stacked structures that reflect a red color, a green color, and a blue color, respectively. By doing so, it is possible to easily manufacture a large size reflective structure and a display apparatus including the large size reflective structure.

In the method described with reference to FIGS. 4A through 4H, only processes described with reference to FIGS. 4A through 4D may be performed, and processes thereafter may not be performed. In this case, the plurality of nanoparticles 200 may be firmly adhered to the first substrate 100A during the process described with reference to FIG. 4A, and after the process described with reference to FIG. 4D, the reflective layer 300 formed on the first substrate 100A may be used as a reflective structure.

Figure 5:
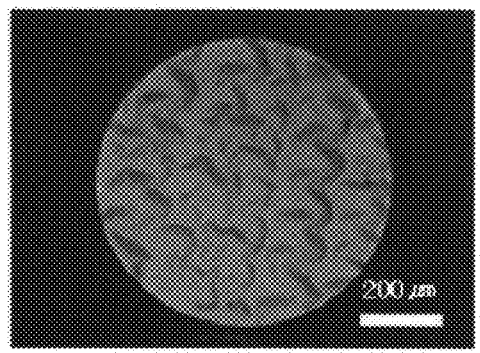
FIG. 5 is an image taken by using an optical microscope, wherein the image indicates a surface of a reflective structure that is manufactured according to example embodiments.

FIG. 5 is an image taken by using an optical microscope, wherein the image indicates a surface of a reflective structure that is manufactured according to an example embodiment.

Referring to FIG. 5, a plurality of wrinkles having a width of about 100 µm are formed on the surface of the reflective layer. The plurality of wrinkles may correspond to the plurality of first uneven portions P1 of FIG. 1. Meanwhile, although not illustrated in FIG. 5, uneven portions having a nano-scale size (the plurality of second uneven portions P2 of FIG. 1) may be formed on an entire surface of a wrinkled reflective layer. The uneven portions having a nano-scale size may be verified in a highly magnified image taken by using a scanning electron microscope (SEM).

Figure 6:
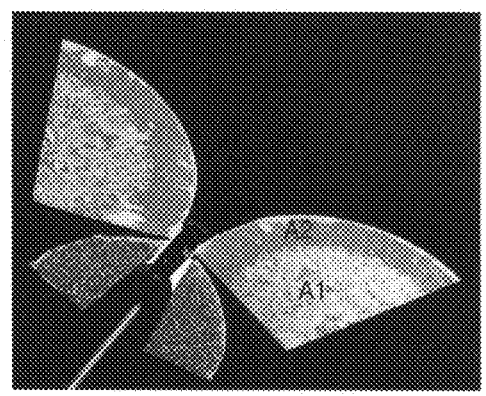
FIG. 6 shows an image of reflective structures manufactured according to example embodiments and a comparative example, wherein the image is taken under a non-specular illumination condition in which an image of an external object is not reflected on a reflective layer.

FIG. 6 shows an image for showing reflection characteristics of reflective structures manufactured according to an example embodiment and a comparative example. In FIG. 6, a first area A1 includes a reflective layer manufactured according to the example embodiment, and a second area A2 includes a reflective layer manufactured according to the comparative example. The first area A1 has undergone rapid cooling and thus is formed to have a similar surface structure to the reflective layer 300 of FIG. 4D, and the second area A2 has not undergone the rapid cooling and thus is formed to have a similar surface structure to the reflective layer 310 of FIG. 2. The image of FIG. 6 is taken under a non-specular illumination condition, in which an image of an external object is not reflected on a reflective layer.

Referring to FIG. 6, the first area A1 exhibits or reflects a bright color, whereas the second area A2 exhibits a relatively dim color. When an incident angle and a viewing angle are different from each other, the first area A1 manufactured according to the example embodiment exhibits a bright color well, but the second area A2 according to the comparative example does not.

Figure 7:
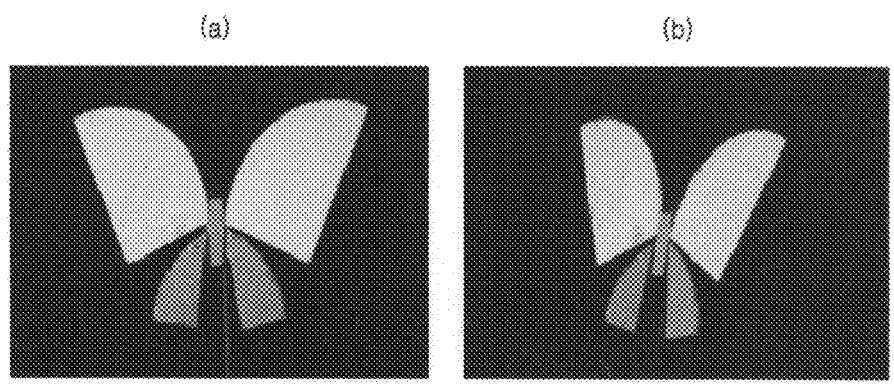
FIG. 7 shows images of reflective structures manufactured according to example embodiments and a comparative example, wherein the images are taken under a specular illumination condition by varying an viewing angle.

FIG. 7 shows images (a) and (b) of the reflective structure of FIG. 6, wherein the images (a) and (b) are taken under different conditions. The images (a) and (b) are taken under a specular illumination condition by varying a viewing angle. That is, the image (a) and the image (b) are different from each other in a photographing angle, a viewing angle.

Referring to FIG. 7, wings of butterflies entirely exhibit the same bright color under the specular illumination condition. In the images (a) and (b) of which photographing angles are different, all wings entirely exhibit the same color. This means that a color is not changed although the viewing angle varies. In contrast, the color of butterfly's body that does not have a random height structure changes according to a viewing angle. The result of FIG. 7 supports that the reflective structure according to the embodiment has an omni-directional reflection characteristic by which a color change according to a viewing angle does not occur.

Referring to the results illustrated in FIGS. 6 and 7, it is possible to understand that the reflective structure according to the example embodiment does not cause the color change according to the viewing angle, and has high reflectance at an omni-direction, (at all viewing angles, thereby exhibiting a color that looks bright at any angle.

Figure 8:
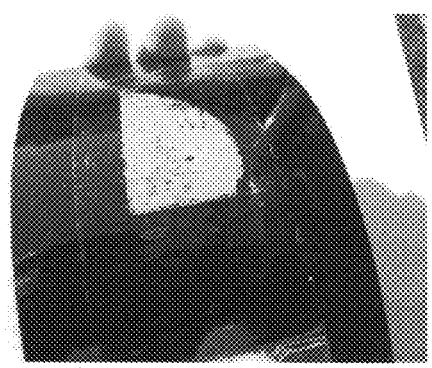
FIGS. 8 and 9 are images of a reflective structure adhered to a flexible substrate according to example embodiments.
Figure 9:
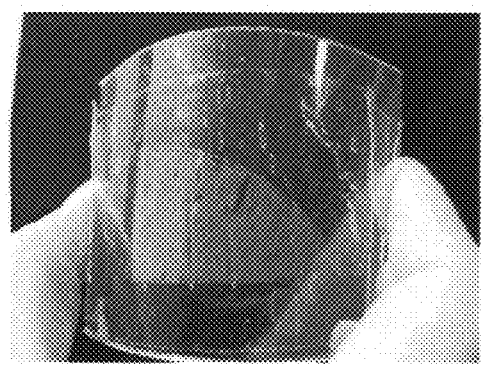

FIGS. 8 and 9 are images of a reflective structure adhered to a flexible substrate according to embodiments. Referring to FIGS. 8 and 9, it is possible to see that the reflective structure adhered to the flexible substrate is flexibly curved.

The reflective structure and the method of manufacturing the reflective structure according to the one or more example embodiments may be applied to various display apparatuses. For example, the aforementioned reflective structure may be applied to not only a dynamic device such as a polymer dispersed liquid crystal (PDLC) display apparatus and a liquid crystal display (LCD), or a static information providing medium such as a signboard, but also to pigments such as paints, or cosmetics. In more particular, the reflective structure according to the one or more example embodiments may be used as a substitution for a color filter of the PDLC display apparatus or the LCD. An absorbance-type color filter according to the related art has a low transmittance and low chromaticity, but by using the reflective structure according to the one or more example embodiments, it is possible to realize color having high efficiency and high chromaticity. In a case where the reflective structure is applied to pigments or cosmetics, the reflective structure may be divided into small pieces and then used by mixing the small pieces with the pigments or the cosmetics. By doing so, it is possible to realize colors that are difficult to be realized by using general pigments.

Figure 10:
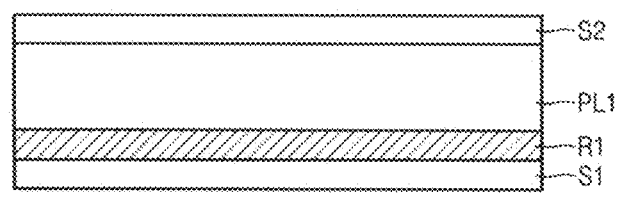
FIG. 10 is a cross-sectional view of a display apparatus including a reflective structure according to example embodiments.

FIG. 10 is a cross-sectional view of a PDLC display apparatus including a reflective structure, according to an example embodiment.

Referring to FIG. 10, a polymer-dispersed liquid crystal layer (hereinafter, liquid crystal layer) PL1 may be formed between a lower substrate Sub1 and an upper substrate Sub2. A color reflector R1 may be formed between the liquid crystal layer PL1 and the lower substrate Sub1. However, the color reflector R1 may be formed below the lower substrate Sub1, and not between the liquid crystal layer PL1 and the lower substrate Sub1. The color reflector R1 may be the reflective structure according to one or more example embodiments. Although not illustrated in detail in FIG. 10, the color reflector R1 may include a red color reflection area, a green color reflection area, and a blue color reflection area. If three different types of reflective layers are formed in different regions of a substrate and thicknesses and/or materials of those three layers vary, those three layers may reflect different colors, respectively. Thus, those three layers may correspond to the red color reflection area, the green color reflection area, and the blue color reflection area, respectively. The PDLC display apparatus of FIG. 10 may be a flexible display apparatus, but not limited thereto.

Although not illustrated in FIG. 10, an absorbance layer may further be formed below the color reflector R1. The absorbance layer may function to absorb light that is not reflected by the color reflector R1, i.e., light that passes through the color reflector R1. For example, in the red color reflection area of the color reflector R1, color other than red color may pass through the color reflector R1 and then may be absorbed by the absorbance layer. The absorbance layer may be optionally disposed. Also, a substrate or nanoparticles of the color reflector R1 may be used as an absorbance element. According to cases, a predetermined or a given color may be colored in the nanoparticles of the color reflector R1.

The reflective structure according to the one or more embodiments may be applied to not only the PDLC display apparatus of FIG. 10 but also to other various display apparatuses.

While example embodiments have been shown and described with reference to the accompanying drawings, the scope of the present application should not be construed as being limited to example embodiments. For example, it will be understood by one of ordinary skill in the art that the reflective structure, the display apparatus including the reflective structure and the methods of manufacturing the reflective structure and the display apparatus may vary. Descriptions of features or aspects within each embodiment should typically be considered as available for other similar features or aspects in other embodiments.

What is claimed is:

1. A reflective structure comprising:
    a reflective layer, wherein the reflective layer has a curved surface as a result of a plurality of first uneven portions, and
    wherein the curved surface has a plurality of second uneven portions having a nano-scale size less than a micro-scale size of the plurality of first uneven portions on the curved surface, and the plurality of second uneven portions are formed along an upper surface of each of the first uneven portions.

2. The reflective structure of claim 1, wherein the plurality of first uneven portions are in the range of tens to hundreds of micrometers in width.

3. The reflective structure of claim 1, wherein the plurality of second uneven portions are in the range of tens to hundreds of nanometers in width.

4. The reflective structure of claim 1, wherein the reflective layer is on a plurality of nanoparticles.

5. The reflective structure of claim 1, further comprising a transparent and flexible material layer on the reflective layer.

6. The reflective structure of claim 5, wherein the transparent and flexible material layer includes a polymer layer.

7. The reflective structure of claim 1, wherein the reflective structure is on a flexible substrate or a rigid substrate.

8. The reflective structure of claim 1, wherein at least a portion of the plurality of first uneven portions constitute a wrinkled shape.

9. The reflective structure of claim 1, wherein the reflective layer has a structure in which first layers and second layers are alternately stacked, and
wherein the first layer and the second layer are different dielectric layers, or one of the first layer and the second layer is a dielectric layer and the other one of the first layer and the second layer is a metal layer.

10. A display apparatus comprising the reflective structure of claim 1.

11. A method of manufacturing a reflective structure, the method comprising:
forming a reflective layer having an uneven surface as a result of a plurality of uneven portions having a nano-scale size; and
forming a plurality of uneven portions having a micro-scale size on the surface of the reflective layer while maintaining the plurality of uneven portions having a nano-scale size, wherein the plurality of uneven portions having a nano-scale size are formed along an upper surface of each of the plurality of uneven portions having a micro-scale size.

12. The method of claim 11, wherein the forming of the plurality of uneven portions having the micro-scale size includes rapid cooling the reflective layer.

13. The method of claim 12, wherein the rapid cooling of the reflective layer includes spraying a volatile liquid on the reflective layer.

14. The method of claim 11, wherein the forming of the reflective layer comprises:
forming a plurality of nanoparticles on a first substrate; and
forming the reflective layer on the plurality of nanoparticles,
wherein the reflective layer has an uneven surface as a result of the plurality of nanoparticles.

15. The method of claim 14, wherein at least some of the plurality of nanoparticles are formed in such a manner that a distance between adjacent nanoparticles is in the range of nanometers to tens of nanometers.

16. The method of claim 14, further comprising forming a transparent and flexible material layer on the reflective layer.

17. The method of claim 16, further comprising separating a stacked structure from the first substrate, wherein the stacked structure includes the plurality of nanoparticles, the reflective layer, and the transparent and flexible material layer.

18. The method of claim 17, further comprising adhering the stacked structure to a second substrate.

19. The method of claim 18, wherein the second substrate is a flexible substrate or a rigid substrate.

20. A method of manufacturing a reflective structure, the method comprising:
forming a plurality of nanoparticles on a first substrate;
forming a reflective layer on the first substrate so as to cover the plurality of nanoparticles;
forming a flexible material layer on the reflective layer; and
separating a stacked structure from the first substrate, wherein the stacked structure includes the plurality of nanoparticles, the reflective layer, and the flexible material layer.
wherein the reflective layer includes a plurality of first uneven portions having a micro-scale size and a plurality of second uneven portions having a nano-scale size, and
the plurality of second uneven portions are formed along an upper surface of each of the first uneven portions.

21. The method of claim 20, wherein the plurality of nanoparticles are of non-uniform size.

22. The method of claim 20, wherein the reflective layer has an uneven surface as a result of the plurality of nanoparticles.

23. The method of claim 20, further comprising adhering the stacked structure that is separated from the first substrate to a second substrate.

24. The method of claim 23, wherein the second substrate is a flexible substrate or a rigid substrate.

\* \* \* \* \*